No. 625,631. Patented May 23, 1899.
A. C. YOUNG.
COMBINED FERTILIZER DISTRIBUTER AND COTTON SEED PLANTER.
(Application filed Mar. 18, 1899.)
(No Model.)
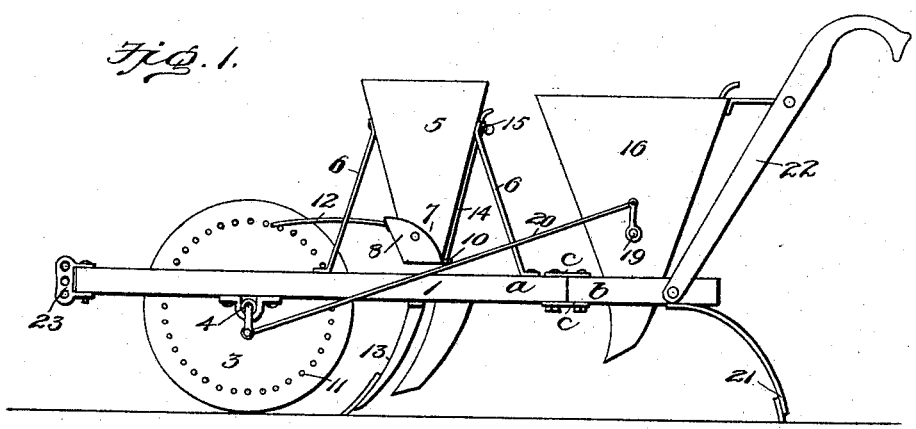
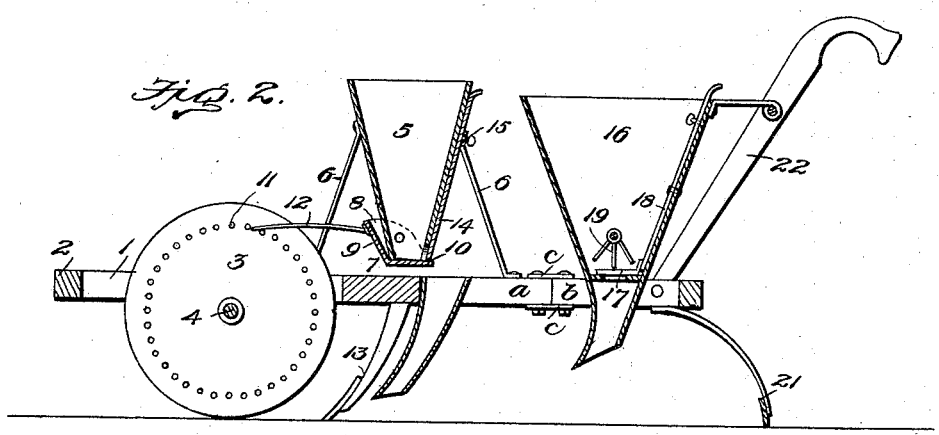
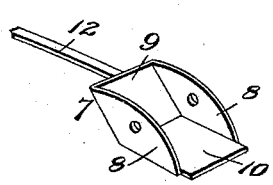
Inventor
Andrew C. Young.
Witnesses
by H. B. Willson & Co.
Attorneys

UNITED STATES PATENT OFFICE.

ANDREW C. YOUNG, OF ALBERTVILLE, ALABAMA.

COMBINED FERTILIZER-DISTRIBUTER AND COTTON-SEED PLANTER.

SPECIFICATION forming part of Letters Patent No. 625,631, dated May 23, 1899.

Application filed March 18, 1899. Serial No. 709,577. (No model.)

*To all whom it may concern:*

Be it known that I, ANDREW C. YOUNG, a citizen of the United States, residing at Albertville, in the county of Marshall and State of Alabama, have invented certain new and useful Improvements in a Combined Fertilizer-Distributer and Cotton-Seed Planter; and I do declare the following to be a full, clear, and exact description of the invention, such as will enable others skilled in the art to which it appertains to make and use the same.

The invention relates to a combined fertilizer-distributer and cotton-seed planter.

The object of the invention is to combine in one machine a construction by which fertilizer may be distributed and seed planted at the same time, or when it is not desired to plant seed, but simply to distribute fertilizer, that part of the machine carrying the seed-hopper and its operating mechanism may be removed and only the fertilizer-distributer used, thus enabling me to operate the fertilizer-distributer without the necessity of carrying the weight of the seed-planting mechanism.

A further object of the invention is to provide means of this character which shall be simple of construction, durable in use, and comparatively inexpensive of production.

With these objects in view the invention consists in certain features of construction and combination of parts, which will be hereinafter fully described and claimed.

In the drawings, Figure 1 is a side elevation of my machine. Fig. 2 is a longitudinal sectional view of the same. Fig. 3 is a perspective view of the fertilizer-hopper valve.

In the drawings the supporting-frame is preferably rectangular in form and is composed of the longitudinal side pieces 1 and the end piece 2. Each side piece is composed of two parts *a* and *b*, which are coupled together by clip-plates and bolts *c* for a purpose hereinafter described.

3 denotes the front supporting-wheel, which is journaled in the side pieces 1 and is provided with a crank-axle 4.

5 denotes the fertilizer-hopper supported by brackets 6 upon the side pieces of the frame. This hopper is preferably tapered, as shown, and has a valve 7 at its lower end. This valve consists of side pieces 8, a front piece 9, and a bottom piece 10, which is adapted to close the opening at the lower end of the hopper. The side pieces 8 are pivoted to the sides of the hopper, so as to enable the bottom piece to be rocked from under the opening.

11 denotes an annular row of pins carried by the supporting-wheel 3, and 12 denotes a rod carried by the front piece of the valve and adapted to engage these pins. As the machine is moved along, the forward end of the rod 12 is successively engaged by the pins of the wheel 3 and a quick shaking motion imparted to the valve 7, causing its lower end 10 to be reciprocated back and forth below the hopper, opening and closing the same and allowing the fertilizer to drop out and be distributed into the furrow made by the opener 13.

To control the discharge of the fertilizer, I employ a slide-valve 14, which extends down along the rear side of the hopper and is held in adjustment by a thumb-screw 15.

16 denotes the seed-hopper, arranged at the rear of the fertilizer-hopper and, like the fertilizer-hopper, provided with tapering front and back pieces. 17 denotes a valve arranged in the bottom of said hopper, and 18 denotes a rod connected to the valve and pivoted to the back piece of the hopper and adapted to control the discharge of seed from said hopper.

19 denotes a stirrer pivoted transversely in the seed-hopper and connected to the crank 4 of the wheel 3 by a pitman 20, so that as said wheel rotates the stirrer will be rocked, thus feeding the seed through the opening in the bottom of the hopper and allowing it to discharge into the furrow made by the furrow-opener before referred to and be covered by the seed-coverer 21.

22 denotes the handles, and 23 the clevis.

In operation, the respective hoppers being filled with fertilizer and seed, as the machine is drawn forward the furrow-opener will open the ground in advance of the falling fertilizer, which will fall into said furrow and be covered by the loose dirt falling down on top of the fertilizer, so that the seed from the seed-hopper will not come in direct contact with the fertilizer and thus be burned. The seed having been discharged upon the fine layer of dirt which has fallen over the fertilizer is now covered by the furrow-coverer arranged at the rear end of the machine.

Should it be desired to use simply the fertilizer-distributer, the section $b$ of the frame of the machine may be removed and the handles attached to the section $a$. The pitman 20 is also removed from the crank 4.

From the foregoing description, taken in connection with the accompanying drawings, the construction, operation, and advantages of my improved machine will be readily apparent without requiring an extended explanation, and it will be seen that the device is well adapted for the purpose for which it is designed.

Changes in the form, proportion, and the minor details of construction may be resorted to without departing from the spirit or sacrificing any of the advantages of this invention.

Having thus described the invention, what is claimed, and desired to be secured by Letters Patent, is—

In a machine of the character described, the combination with the rectangular supporting-frame, each side piece of which is composed of two separable parts, a supporting-wheel, a fertilizer-hopper carried by the forward sections of the frame, a seed-hopper carried by the rear sections of the frame, handles removably secured to the rear section of the frame and adapted to be secured to the forward section of the frame, and valves carried by the hoppers and adapted to control the discharge of their contents, substantially as and for the purpose set forth.

In testimony whereof I have hereunto set my hand in presence of two subscribing witnesses.

ANDREW C. YOUNG.

Witnesses:
 THOS. N. FREEMAN,
 W. C. KELLEY.